TIME DIVISION MULTIPLEX TELECOMMUNICATION SWITCHING SYSTEMS

Original Filed May 31, 1962 Sheet 1 of 2

THOMAS H. FLOWERS

INVENTOR

BY Hall & Houghton

ATTORNEY

THOMAS H. FLOWERS,

INVENTOR

BY Hall · Houghton

ATTORNEY

United States Patent Office 3,439,123
Patented Apr. 15, 1969

3,439,123
TIME DIVISION MULTIPLEX TELECOMMUNICATION SWITCHING SYSTEMS

Thomas Harold Flowers, Mill Hill, London, England, assignor to Her Majesty's Postmaster General, London, England Original application May 31, 1962, Ser. No. 199,043, now Patent No. 3,213,202, dated Oct. 19, 1965. Divided and this application Feb. 4, 1965, Ser. No. 430,386
Claims priority, application Great Britain, June 1, 1961, 19,846/61
Int. Cl. H04j *3/08;* H03k *17/62*
U.S. Cl. 179—15 4 Claims

ABSTRACT OF THE DISCLOSURE

A switching matrix for a telecommunication system, the matrix comprising a number of electronic crosspoint gates. Each gate has an individual control circuit for opening and closing the gate, the circuit including a pulse source for charging a capacitor to a specified potential at which the gate conducts, and a source of sawtooth pulses also connected to the capacitor, the slope of the sawtooth pulses determining the rate of discharge of the capacitor while the instant of reversal of the sawtooth pulses determines the time instant at which the gate shuts.

*Cross reference to related application*

This application is a division of U.S. patent application Ser. No. 199,043, filed May 31, 1962, now U.S. Patent No. 3,213,202, issued Oct. 19, 1965.

*Background of the invention*

This invention relates to switching matrices for time division multiplex telecommunication systems of the kind in which information is transmitted between different parts of the system by means of physical conductors. In particular the invention relates to time division multiplex telephone switching systems.

Such systems employ highways over which communication is established and these are interconnected by cross-points which may be electronic gates arranged in a matrix and providing impedances which can be switched between values which are either very high or very low. The impedance value is changed by means of a suitable control signal applied to the gate, the object being to change the impedance value very quickly, to keep the gate open for as large a proportion as possible of the channel time of the time division multiplex channels to be placed in communication via the gate and to close the gate at a known, clearly defined instant of time.

*Summary of the invention*

According to the present invention a switching matrix for a time division multiplex telecommunication system comprises an assembly of electronic cross-point gates each interconnecting one time division multiplex highway incoming to the switch with one time division multiplex highway outgoing from the switch, and for each cross-point gate, an individual control circuit for opening and closing the gate by means of a control potential derived by the circuit from a source of pulses each of which determines the instant at which the gate is opened and a source of sawtooth pulses each of which determined the instant at which the gate is closed.

Rectangular pulses may be applied to charge one plate of a capacitor whose other plate is charged by the sawtooth pulses.

Preferably, the control potential is used to switch the conductivity of a transistor which is connected to the gate in such manner that changes in the collector potentials of the transistor open and close the gate. The gates may themselves be transistors in which case the collector potentials can be applied to the bases of the transistor gates.

Each gate may comprise several transistors where the highways consist of several transmission paths. In this case the several transistors are controlled by the transistor whose conductivity is switched by the control potential.

*Brief description of the drawings*

By way of example only, a switching matrix embodying the invention will now be described in greater detail with reference to the accompanying drawings of which.

The switch to be described is suitable for use in the communication system described in the U.S. patent specification No. 3,213,202 in the name of Thomas Harold Flowers, patented Oct. 19, 1965 to which reference should be made for details of the system and its manner of operation.

Figure 1:
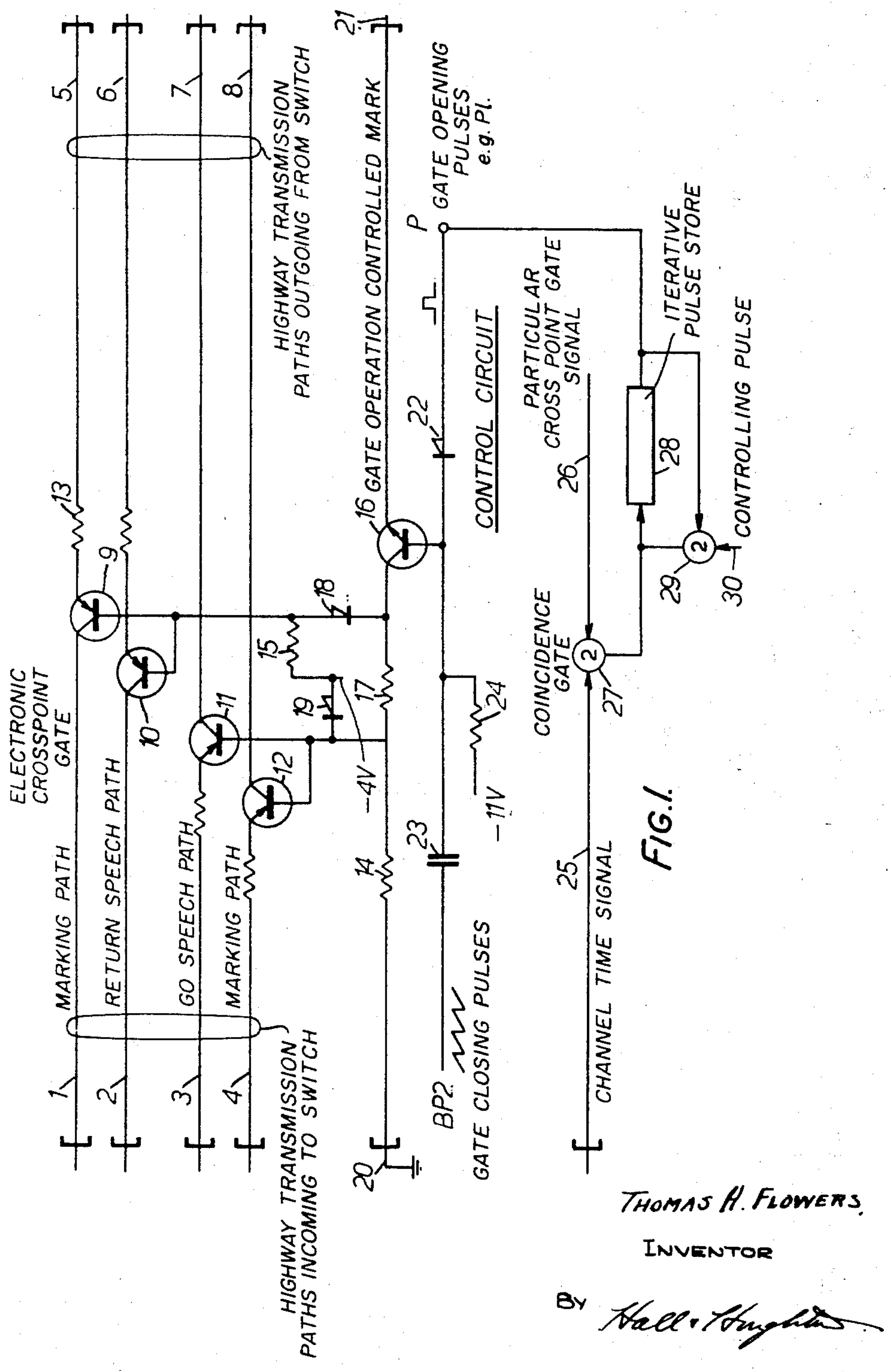
FIG. 1 is a circuit diagram of part of the switch.

In FIG. 1, paths 1 . . . 4 constitute one of several trunks incoming to a switching matrix and are joined by electronic cross-point gates to other trunks outgoing from the matrix and of which only one is shown in the drawing and comprises paths 5 . . . 8. Each trunk has two transmission paths in each direction, therebeing, for the incoming highway shown, GO speech path 3, RETURN speech path 2 and marking paths 1 and 4. It will be understood that there are other incoming trunks and other outgoing trunks and that each incoming trunk is connected to at least two of the outgoing trunks via the switching matrix. The trunks shown are interconnected by an electronic cross-point gate comprising four transistors each of which switches one of the paths and which are shown as connected at their bases in pairs, i.e. transistors 9 and 10 interconnecting paths 1 and 2 with paths 5 and 6 respectively and transistors 11 and 12 interconnecting paths 3 and 4 with paths 7 and 8 respectively. The transistors are part of a switching matrix comprising a number of such transistors each interconnecting a particular incoming trunk with a particular outgoing trunk.

In series connection with the emitters of the transistors 9 . . . 12 are resistors, for example resistor 13 in series connection with the emitter of transistor 9, which, together with the emitter impedance when the transistor is conducting, provide a suitable terminating impedance for a trunk terminating at the cross-point gate.

The bases of transistors 11 and 12 are normally at earth potential derived via a resistor 14, the bases of transistors 9 and 10 being at a different potential, negative with respect to earth for the polarities assumed in this embodiment, derived via a resistor 15. In the normal condition, none of the transistors 9 . . . 12 is conducting but they are all rendered conducting by current flow through a control circuit including a transistor 16 whose collector is connected to the bases of transistors 11 and 12 via a resistor 17 and to the bases of transistors 9 and 10 via a diode 18 which prevents current flow from the bias voltage source connected to resistor 15 to earth via resistor 14.

Transistor 16, when conducting, saturates and thus brings the potential of the bases of transistors 9 and 10 near to that of its emitter and causes the bases of transistors 11 and 12 to be clamped by a diode 19 to the potential of the bases of transistors 9 and 10 when non-conducting.

The base of transistor 16 is connected to terminal P via diode 22 and to a pulse source BP2 via capacitor 23. A bias source of negative potential is also connected to the base of transistor 16 via a resistor 24 to maintain the transistor in a nonconducting condition.

The switching matrix comprises a number of such cross-point gates each of which has it own control circuit certain points of which are commoned in the manner described in the specification referred to above. Thus, the resistors 14 of a row of transistors of the matrix are commoned to lead 20, whilst the emitters of the transistors 16 of a column are commoned to lead 21. Flow of current along leads 20 and 21 indicate, respectively, the operation of a cross-point gate in a row and column.

Terminal P is connected as shown in the output of an iterative pulse store represented by block 28 whose input is connected to the output of a coincidence gate 27. The inputs to gate 27 appear on leads 25 and 26, lead 25 indicating at which channel time the gate is to be opened and lead 26 indicating which cross-point gate is to be opened. Iterative stores are well known and block 28 represents the store together with its associated circuitry except the recirculation path which is shown separately.

Iterative store 28 produces a train of short pulses whose repetition rate is the same as that of the channel pulses of the system described in the specification of co-pending patent application Ser. No. 199,043 (now U.S. Patent No. 3,213,202) of which this application is a division.

As is usual with iterative stores, store 28 has a recirculation path via coincidence gate 29, recirculation being maintained for as long as required by pulses applied to gate 29 via lead 30. Again, as is well known, the duration of pulses appearing at the ouptut of the iterative store can be made much less than the duration of input pulses and, in the present case, the duration of pulses appearing at the output of store 28 is much less than the duration of the channel pulses.

Figure 2:
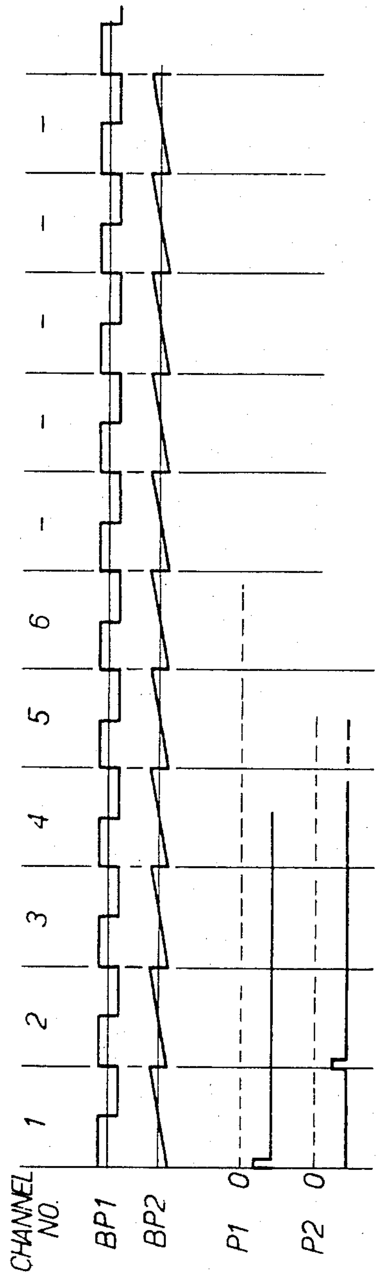
FIG. 2 shows waveforms of certain pulse trains used to operate the swtich.

FIG. 2 shows the waveforms of pulse trains used in the operation of the cross-point gates and of the waveforms shown, BP1 is a rectangular waveform of alternate positive and negative pulses of equal duration and together equal to a channel pulse duration and is the datum timing for the system described in the aforesaid parent application, now U.S. Patent No. 3,213,202 wherein its relationship to the pulses derived from or synchronized with it is illustrated in FIGS. 4(*a*) and 4(*b*) and described at columns 5 and 6. This pulse train BP1 does not appear in the circuit of FIG. 1 herein, but is illustrated in FIG. 2 herein to show its relationship to pulses BP–2 and P1 and P2. BP2 is a sawtooth waveform each pulse of which has a duration equal to the combined duration of the positive and negative pulses of the waveform BP1. Also shown in FIG. 2 are waveforms of two further pulse trains P1, P2. As can be seen from FIG. 2, the pulses of the pulse trains P1 and P2 occur at the commencement of channel pulses of the channels 1 and 2 respectively when the pulses of sawtooth waveform BP2 are at a minimum. There is a finite time before the sawtooth pulses commence to rise in amplitude and the duration of the pulses P1, P2, etc., must be slightly greater than the finite time which is of the order of 0.2 microsecond.

As is described in the specification referred to above, cross-point gates are rendered conducting to connect synchronous channels on the two trunks interconnected by the gates by the application to terminal P of a pulse train such as pulse train P1 for channel 1 or P2 for channel 2. Thus, the transistors 9 . . . 12 are rendered conducting by the application of, say pulse train P1 to terminal P, the leading edge of each pulse P1 occurring when the waveform BP2 is at its minimum. The P1 pulses charge capacitor 23 via diode 22 until transistor 16 saturates when the base current of the latter absorbs most of the incoming pulse current. Thereafter, the capacitor 23 discharges into the base circuit of transistor 16 at a substantially constant rate determined by the slope of waveform BP2 maintaining transistor 16 in the saturated condition until the waveform BP2 reverses and switches off transistor 16.

Thus, the instant at which the cross-point gates conduct is determined by the amplitude of the pulse train on terminal P in conjunction with the circuit parameters whilst the instant at which the gates cease to conduct is determined by the instant of reversal of the sawtooth pulses.

I claim:

1. A switching matrix for a time division multiplex telecommunication system comprising an assembly of electronic cross-point gates each interconnecting one time division multiplex highway incoming to the switch with one time division multiplex highway outgoing from the switch, and, for each cross-point gate, an individual control circuit for opening and closing the gate by means of a control potential provided by the circuit from a source of pulses each of which determines the instant at which the gate is opened and a source of sawtooth pulses each of which determines the instant at which the gate is closed.

2. A switching matrix as claimed in claim 1 in which the source of pulses is joined to one plate of a capacitor to whose other plate the source of sawtooth pulses is connected.

3. A switching matrix as claimed in claim 1 in which the control potential is used to switch the conductivity of a transistor connected to the cross-point gate in such manner that the changes in the collector potential of the transistor open and close the gate.

4. A switching matrix as claimed in claim 1 in which each cross-point gate is a transistor gate.

References Cited

UNITED STATES PATENTS

| | | | |
|---|---|---|---|
| 3,048,717 | 8/1962 | Jenkins | 307—232 |
| 3,122,652 | 2/1964 | Kobbe et al. | 307—269 |
| 3,135,874 | 6/1964 | Lucas et al. | 307—88.5 |
| 3,136,961 | 6/1964 | Schraivogel | 332—15 |
| 3,213,202 | 10/1965 | Flowers | 179—18 |
| 3,251,943 | 5/1966 | Von Sanden | 179—15 |
| 3,278,689 | 10/1966 | Sanders et al. | 179—18 |

ROBERT L. GRIFFIN, *Primary Examiner.*

CARL R. VON HELLEM, *Assistant Examiner.*

U.S. Cl. X.R.

307—240